March 28, 1961 D. H. ROBBINS 2,976,787
FONT PLATE MAGAZINE FOR PHOTOTYPOGRAPHICAL MACHINE
Filed Dec. 3, 1958 7 Sheets-Sheet 1

Fig.1.

INVENTOR.
DANIEL H. ROBBINS
BY
Morrison, Kennedy & Campbell
ATTORNEYS

Fig. 2.

March 28, 1961   D. H. ROBBINS   2,976,787
FONT PLATE MAGAZINE FOR PHOTOTYPOGRAPHICAL MACHINE
Filed Dec. 3, 1958   7 Sheets-Sheet 5

INVENTOR.
DANIEL H. ROBBINS
BY
Morrison, Kennedy & Campbell
ATTORNEYS

March 28, 1961 D. H. ROBBINS 2,976,787
FONT PLATE MAGAZINE FOR PHOTOTYPOGRAPHICAL MACHINE
Filed Dec. 3, 1956 7 Sheets-Sheet 6

Fig. 8.

INVENTOR.
DANIEL H. ROBBINS
BY
Morrison, Kennedy & Campbell
ATTORNEYS

United States Patent Office 2,976,787
Patented Mar. 28, 1961

2,976,787

FONT PLATE MAGAZINE FOR PHOTO-TYPOGRAPHICAL MACHINE

Daniel H. Robbins, Bronxville, N.Y., assignor to Mergenthaler Linotype Company, a corporation of New York Filed Dec. 3, 1958, Ser. No. 778,003

20 Claims. (Cl. 95—4.5)

This invention relates to a character font plate magazine and selecting device for use in a phototypographical composing machine, such, for example, as is shown and described in U.S. application for Letters Patent Serial No. 419,012, filed March 26, 1954.

In a machine of the type therein described, a stationary font plate is provided having an array of transparent characters disposed on an opaque background. A light source to one side of the font plate serves to project light through the transparent characters. A shutter mechanism, interposed in the path of the projected light, is actuated to shut off light from all of the characters except the one selected for photographing. The light passing through the selected character then enters a collimating lenslet, individual to and associated with the particular character, which collimates the light defining the character. Thereafter, the collimated light is focused by an imaging lens common to all of the characters. A point size changing lens system controls the size of the finally recorded character images, which are formed on a stationary film by a projection lens system mounted on a continuously moving line composing carriage.

It will be appreciated that during typographical composition, it is often desirable, for one reason or another, to vary the style of the type being employed throughout the body of the text. For example, when special words or phrases are to be emphasized, they are usually printed in italics to distinguish them from the general material which may, for instance, be composed in Roman; or an entire paragraph may be printed in bold face type to break up the monotony of the general type face being used. In order to so vary the style of type being composed, it is necessary to utilize more than one font plate, since, as is well known, a single font plate contains an assortment of characters of only one type style. Furthermore, it is often desirable to vary the point size of the characters being composed, whether the type style is changed or not, and although the point size changing lens system enables a single font plate to be employed over a range of type sizes, inasmuch as all the proportions of a character do not change uniformly with the change in point size, several font plates of each type style are ordinarily provided to cover the full range of point size. From the foregoing examples, it is apparent that there are many occasions, during any extended period of photocomposition, when a font plate operatively positioned in the machine must be replaced by another font plate of one type style or another. It is obvious that during the replacement procedure, the photocomposing machine is out of operation, and therefore, if the time required to change plates is relatively long, the total machine down time during the period of composition may easily become excessive and much productive time will be lost. In addition, since it is occasionally desirable to employ a font plate, in the photocomposing process, which is not presently stored in the magazine, it is important that an operator be able to remove a stored font plate, and replace it with a new font plate conveniently and rapidly, and thereafter be able to quickly position the new font plate operatively in the machine.

In the aforementioned copending application Serial No. 419,012, a font selection mechanism was disclosed which comprises a rotatable disc carrying only five different font plates. For the reasons above noted, a choice limited to such a small number of fonts is unsatisfactory. In addition, in order to utilize a new font plate, not presently mounted on the disc, the disc must be removed from its mounting, an old font plate unclamped, and a new font plate clamped in its place, taking care that the newly clamped font plate is properly aligned on the disc. This is, of course, a rather time-consuming process.

It is the object of the present invention to promote efficient photocomposing machine operation by providing a compact font plate magazine and selection device which may be equipped to store a large number of font plates and which is capable of rapidly replacing an operatively positioned font plate with any one of the stored font plates, the replaced font plate being, at the same time, stored in the magazine. Furthermore, since the font plates are in no way clamped in the magazine, they may be easily removed from the magazine and replaced, without disturbing the mounting of the magazine.

Although in the following description, the magazine described has a capacity of eighteen font plates, it should be understood that this number is more or less arbitrary and illustrative and of itself has no important significance.

Objects and advantages of the present invention will be apparent from the following description made with reference to the accompanying drawings.

Figure 1:
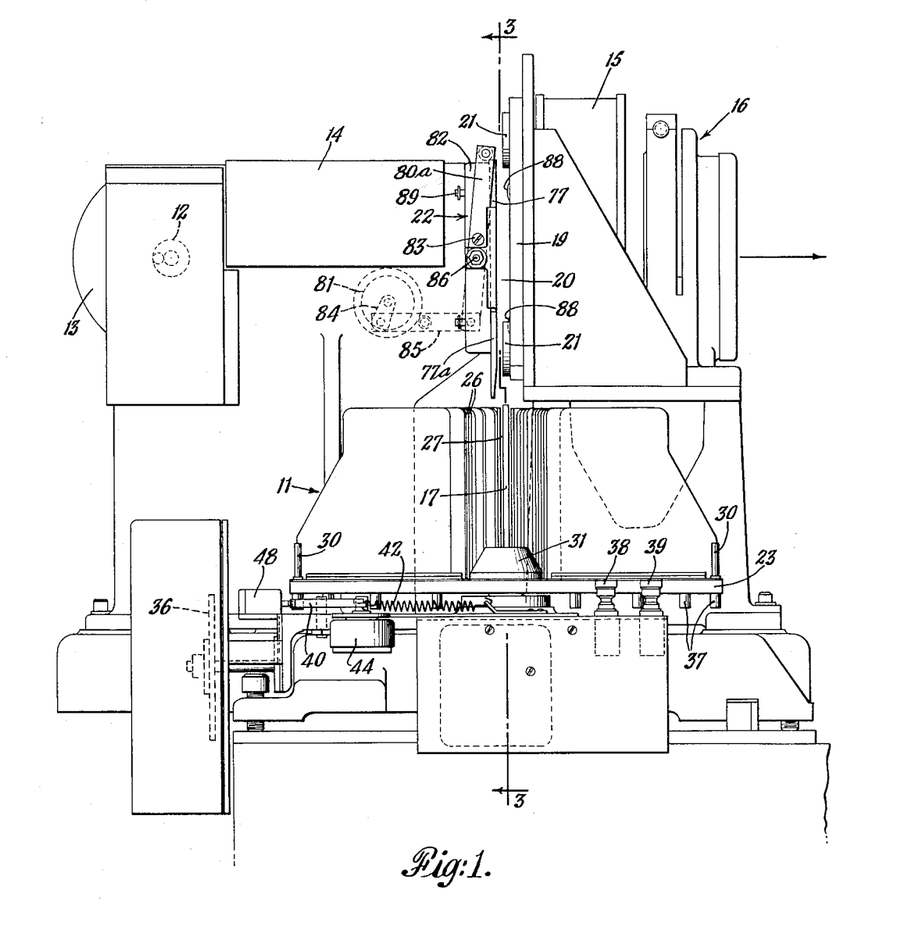
Fig. 1 is a partial side elevational view of a photocomposing machine having the present invention associated therewith.
Figure 2:
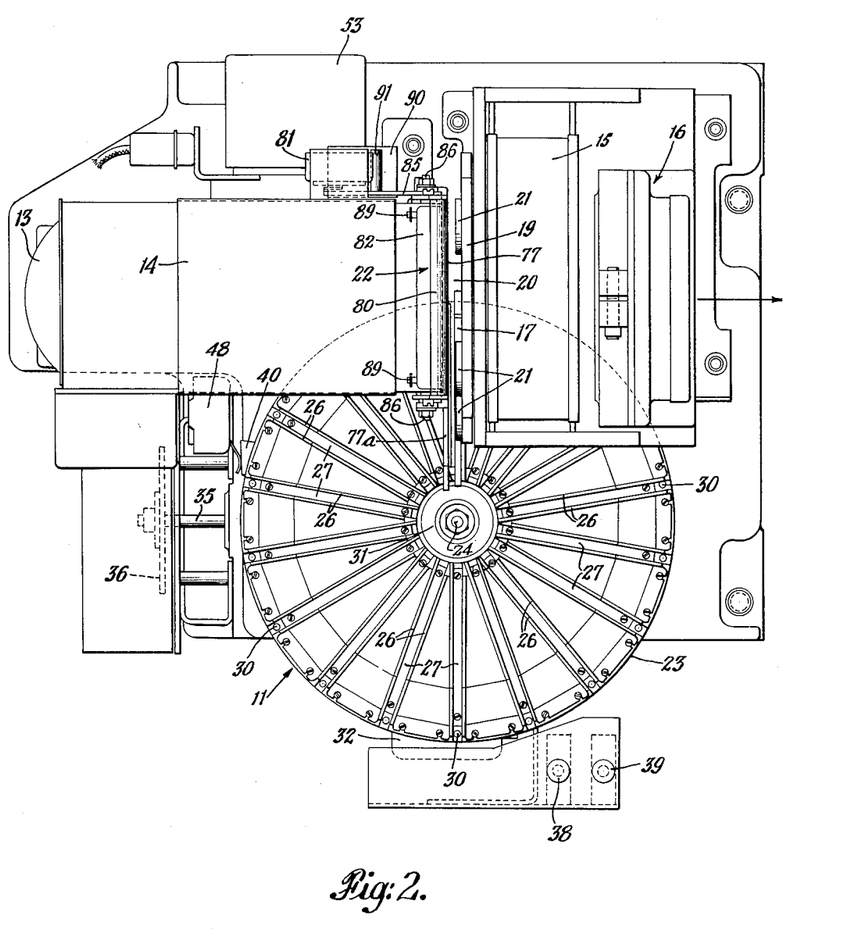
Fig. 2 is a plan view of Fig. 1.
Figure 3:
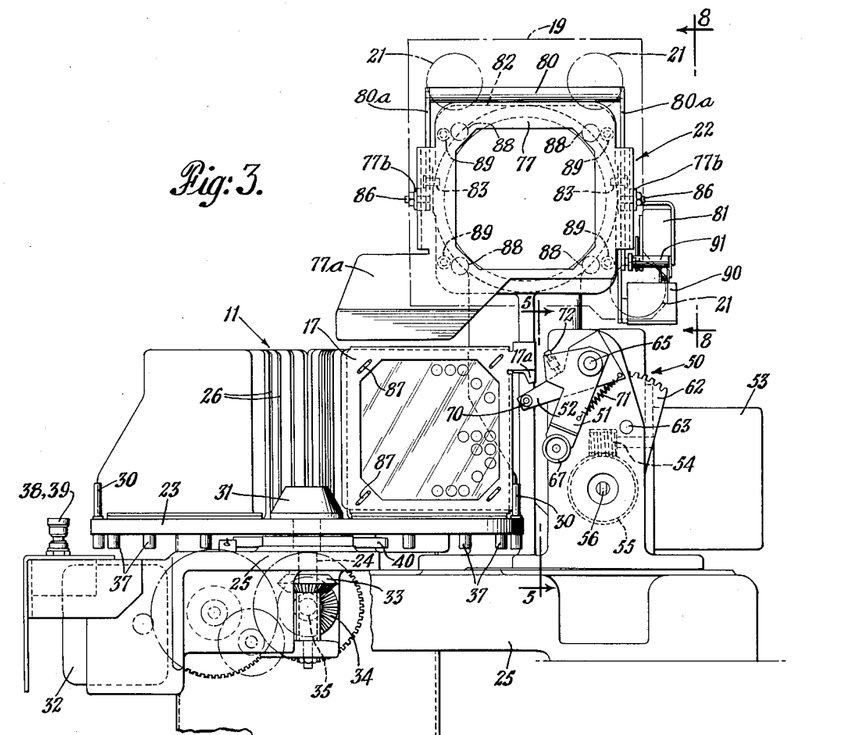
Fig. 3 is a vertical cross-sectional view taken on line 3—3 of Fig. 1.

Referring to Figs. 1, 2 and 3, the font plate magazine 11 of the present invention is shown in relation to the optical system of a photocomposing machine. The optical system, as usual, comprises a light source 12 backed up by a reflector 13 which concentrates the light, an inverted U-shaped hood 14 to prevent the light from straying, a condensing lens system (not shown) disposed beneath the hood 14 for intensifying the light, a shutter system 15 for permitting only the light from the character selected for composition to pass through while blocking out all other light, and a collimating and focusing lens system 16 for forming an image of the selected character and projecting it on a sensitized film. When composition is to take place, a font plate 17, containing a single font of characters, is operatively positioned in the space 20 between the hood 14 and the shutter system 15, aligned by means of abutments 21 mounted on a plate 19, and held in position by a clamping mechanism 22. As mentioned before, the present invention stores a plurality of font plates and rapidly replaces an operatively positioned font plate with any one of the stored plates.

The font plates are stored on edge in a turret or turntable 23, fixed on a shaft 24 which is rotatably mounted in the machine frame 25. Mounted on the upper surface of the turret 23 is a series of pairs of radially disposed partitions 26, each pair forming a radial storage slot 27 for holding a single font plate 17. It is apparent that any number of slots 27 may be arranged on the turret surface, but for purposes of illustration only, eighteen of such slots are provided with the present invention. As may be seen clearly in Fig. 2, the shaft 24 is aligned with the space 20, so that by merely rotating the turret, any font plate disposed thereon may be brought into index position, i.e. into alignment with the space 20, whereupon the font plate so selected may simply be translated in one plane from its storage slot 27 into operative position in the space 20. Means for performing this translation will be described hereinafter.

In order to prevent radial movement of stored font plates 17 during rotation of the turret 23, a series of retaining pins 30 are circumferentially spaced adjacent the edge of the turret, one pin in each slot. The pins 30 also serve as guides to properly position the font plates within the slot and in this latter function cooperate with a conical hub member 31, from which the retaining pins are spaced a distance equal to the length of one side of a font plate (see Fig. 3). Both the rotation of the turret and the oblique sides of the hub member have the effect of urging the font plates into contact with the pins 30, thus properly positioning them for translation into operative position.

Figure 7:
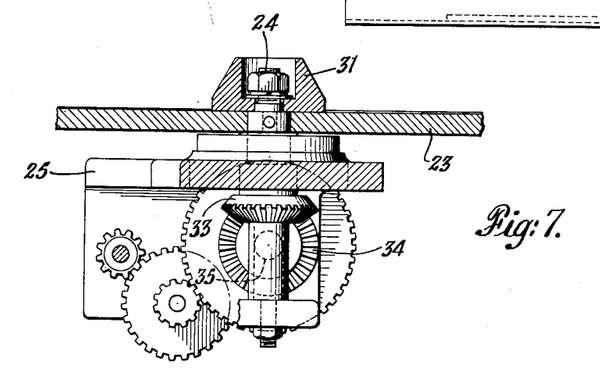
Fig. 7 is a vertical cross-sectional view taken on line 7—7 of Fig. 6.

The turret 23 is rotated by a reversible motor 32 through suitable gearing (see Figs. 3 and 7) which includes a pair of bevel gears 33 and 34, the gear 33 being mounted on the shaft 24, and the other gear 34 being mounted on one end of a shaft 35. Fixed to the other end of the shaft 35 is a commutator 36 which will be fully described hereinafter with reference to the electrical control circuits of Fig. 9. The commutator, which rotates in timed relation with the turret, is utilized to choose the direction of rotation of the turret when a selected font plate is to be brought into alignment with the space 20 for transfer into operative position, thus insuring that the turret rotates through the smallest possible distance when selecting a new font plate. The commutator 36 also serves to arrest the turret motor 32 when the new font plate reaches the index position. The motor 32 is provided with two pushbuttons 38 and 39, which are employed when a font plate not originally stored in the turret is to be operatively positioned in the machine, and whose function will be fully described with reference to Fig. 9.

Figure 6:
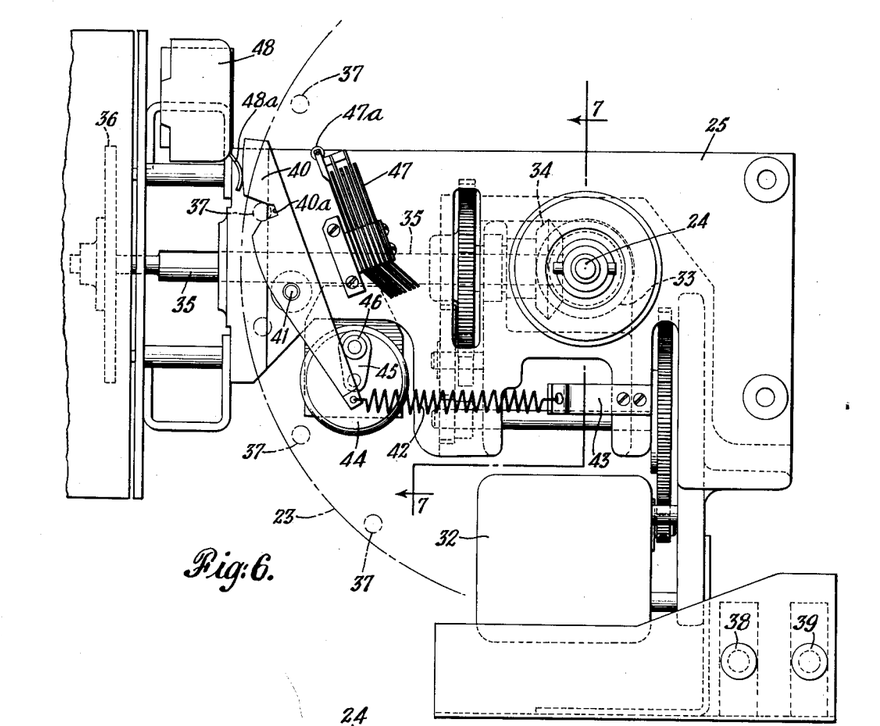
Fig. 6 is a horizontal cross-sectional view taken on line 6—6 of Fig. 1.

Once a selected font plate 17 has been brought into index position, it is desirable to lock the turret 23 against further rotation, which may occur for example, due to inertia of the parts or machine vibrations, so that the correct font plate is lifted out of the turret into operative position, and the storage slot of the operatively positioned font plate remains in the index position. To accomplish this locking action (see Figs. 1 and 6), the turret 23 is provided with a plurality of stop pins 37, projecting from its lower surface and aligned with the retaining pins 30 projecting from the upper surface of the turret, which pins 37 are engageable by a latch 40 pivotally mounted, by a pin 41, on the machine frame 25. The latch 40 is furnished with a notch 40a, near one end, for cooperation with the pins 37, and is biased into engagement with such pins by a tension spring 42 disposed between the other end of the latch 40 and a bracket 43 fixed to the machine frame. A rotary solenoid 44, mounted on the machine frame, has an arm 45 carrying a roller 46 which contacts the latch 40 when the solenoid is deenergized. When the turret is to be rotated to a new position, the solenoid 44 is energized, causing the arm 45 to pivot counterclockwise and thereby pivot the latch 40 clockwise, against the force of the spring 42, resulting in the disengagement of the latch 40 with the pin 37, leaving the turret free to rotate. Upon initial movement of the latch 40, the finger 48a is released, allowing the switch 48 to close, and upon reaching its final position, the latch 40 contacts the roller 47a to close the switch 47; the effect of closing both of these switches will be described hereinafter. When the new position of the turret has been reached, the solenoid 44 is deenergized, and the latch 40 once again engages the proper stop pin 37 to lock the turret against rotation.

Figure 4:
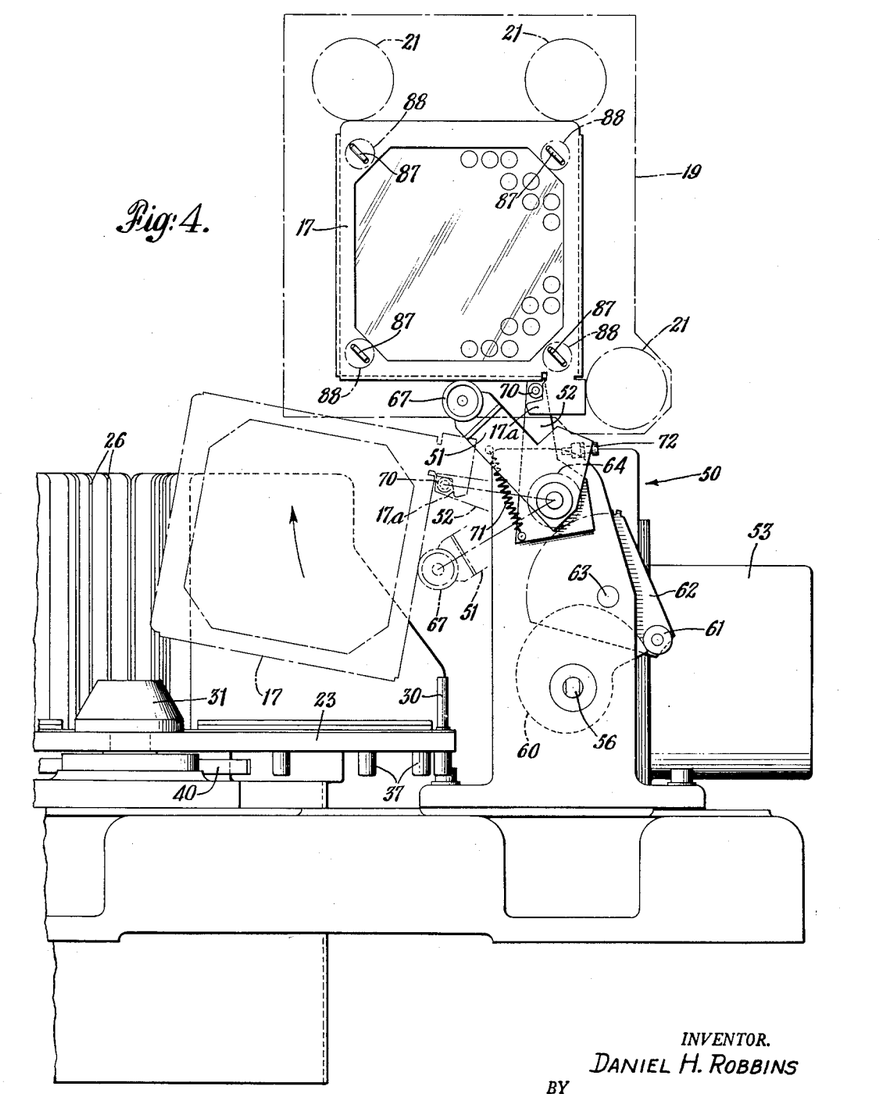
Fig. 4 is an enlarged view of a portion of Fig. 3.
Figure 5:
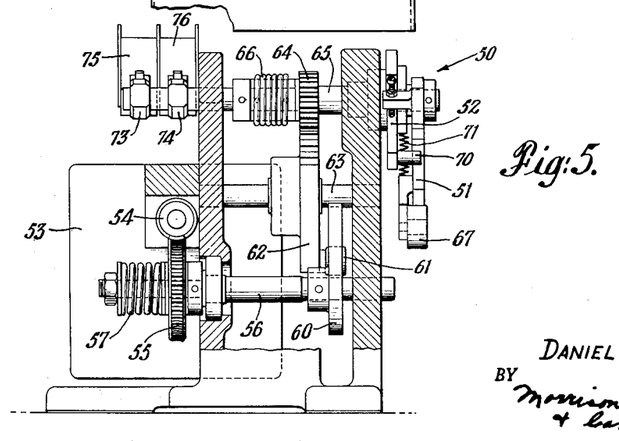
Fig. 5 is an enlarged vertical cross-sectional view taken on line 5—5 of Fig. 3.

Referring now to Figs. 3, 4 and 5, when the turret has been locked in the new position, the font plate disposed in the index position is transferred from its storage slot 27 into operative position in the space 20 by a slinger arm mechanism 50. The slinger arm itself actually comprises two separate resiliently coupled arms 51 and 52 which are normally disposed as shown in Fig. 3. The slinger arm is powered by a reversible motor 53 having a worm 54, fixed to its shaft, which engages a worm wheel 55, rotatably mounted on a shaft 56, which shaft is journally supported in the machine frame, the worm wheel 55 being coupled to the shaft 56 by a torsion clutch 57 (Fig. 5). Also mounted on the shaft 56 is a cam 60 which engages a roller 61 carried by a gear segment 62 mounted on a rotatable shaft 63, the gear segment 62 having a meshing relationship with a gear 64 coupled to a rotatable shaft 65, intermediate the ends thereof, by a second torsion clutch 66. Fixed to one end of the shaft 65 is the arm 51 which carries a roller 67 at its free end for engagement with an edge of the font plate 17 during the transfer operation. Rotatably mounted on the shaft 65, adjacent the arm 51, is the arm 52 having a pin 70 projecting perpendicularly from one side thereof, which pin cooperates with the pick-up ear 17a of the font plate 17 during the transfer operation. A tension spring 71, disposed between the arm 51 and the arm 52, tends to rotate the arm 52 in a clockwise direction, but this motion is resisted by an adjustable stop 72 fastened to the arm 51; the resilient coupling thereby produced insures that the slinger arm, upon lifting the font plate 17 into operative position (see Fig. 4), will position the font plate squarely against the three aligning abutments 21. Mounted on the other end of the shaft 65, opposite the slinger arm, are two cams 73 and 74 which operate two switches 75 and 76 respectively. When the slinger arm is up in its normal position, switch 75 is open and switch 76 is closed; however, when the slinger arm is down in the position shown in Fig. 3, switch 75 is closed and switch 76 is open. The purpose of these switches will be explained with reference to Fig. 9.

When an operatively positioned font plate is to be replaced, therefore, the slinger arm motor 53 is energized and drives the slinger arm into its downward position wherein it places the font plate into its storage slot 27. Notice that the slinger arm continues to move downwardly after placing the font plate in the turret, in order to clear the pick-up ears 17a. The slinger arm motor is then deenergized as the turret rotates to, and is locked in, its new position, at which time the slinger arm motor is energized again, with polarity reversed, and the slinger arm is rotated upwardly. The roller 67 abuts against the edge of the new font plate and the pin 70 catches the hooked pick-up ear 17a thereby enabling the slinger arm to flip the new font plate into operative position.

Figure 8:
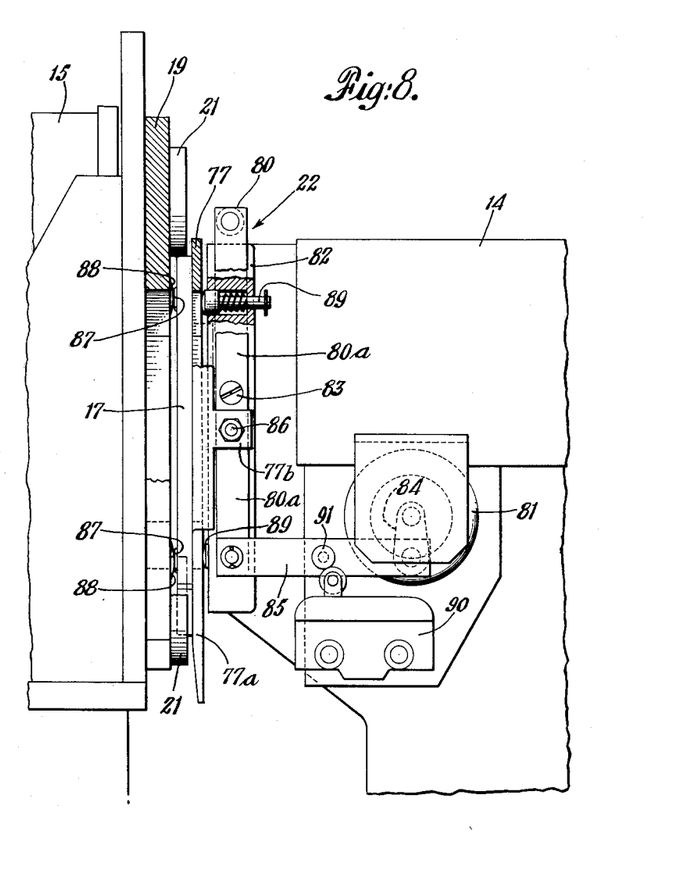
Fig. 8 is a vertical view on line 8—8 of Fig. 3.

Once the slinger arm accurately positions the font plate 17 against the abutment guides 21, the font plate is clamped in place by the above-mentioned clamping mechanism 22 to prevent any movement of the plate during composition. Referring to Figs. 1, 2, 3 and particularly Fig. 8, the clamping mechanism comprises a pressure plate or clamping frame 77, which performs the actual clamping action, an inverted U-shaped member 80, and an activating solenoid 81. Each of the vertical legs of the member 80 is pivotally mounted on the flange 82, which is a part of the machine frame, by the pins 83, and one of the legs 80a is pivotally fastened to the arm 84 of the solenoid 81 by a link 85. The pressure plate 77 is provided with an elongated toe portion 77a, which into the space 20, and a perpendicularly projecting ear 77b on each side thereof, which ears are pivotally mounted on each side thereof, which ears are pivotally mounted on the vertical legs of the member 80 by the pins 86. The tendency of the pressure plate 77 to pivot about the pins 86 is resisted by four identical spring pressed plungers 87, mounted in the flange 82, the plungers having contact with the pressure plate 77 and serving to maintain it in a substantially vertical position at all times.

Now then, when a font plate is to be placed in the space 20, the solenoid 81 is energized causing the solenoid arm 84 to assume the position shown in Fig. 1, wherein a microswitch 90 (Fig. 8) is closed by a detent 91 mounted on the link 85, and the member 80 is pivoted about the pins 83, which action results in drawing the pressure plate 77 into contact with the flange 82 against the pressure of the plungers 89, in order to allow enough room for a font plate to be inserted. When the font plate 17 is aligned against the abutments 21, the solenoid 81 is deenergized and the solenoid arm 84 assumes its normal position shown in Fig. 8, whereby the member 80 is pivoted into a vertical position causing the pressure plate to press the four pin bearings 87 of the font plate 17 (see Fig. 4) against the four convex bearing surfaces 88 on the plate 19, thus clamping the font plate in proper position for composing. In addition, the microswitch 90, whose function will be more fully explained hereinafter, is opened.

It has been shown, therefore, that the present invention provides a means for rapidly placing any one of a large number of character bearing font plates into an operative position in the photocomposing machine. Thereafter, when the font plate has been used as desired, it may rapidly be replaced by another of the font plates stored in the magazine. In addition, operation of the invention is completely automatic, being controlled by the customary coded tape.

Figure 9:
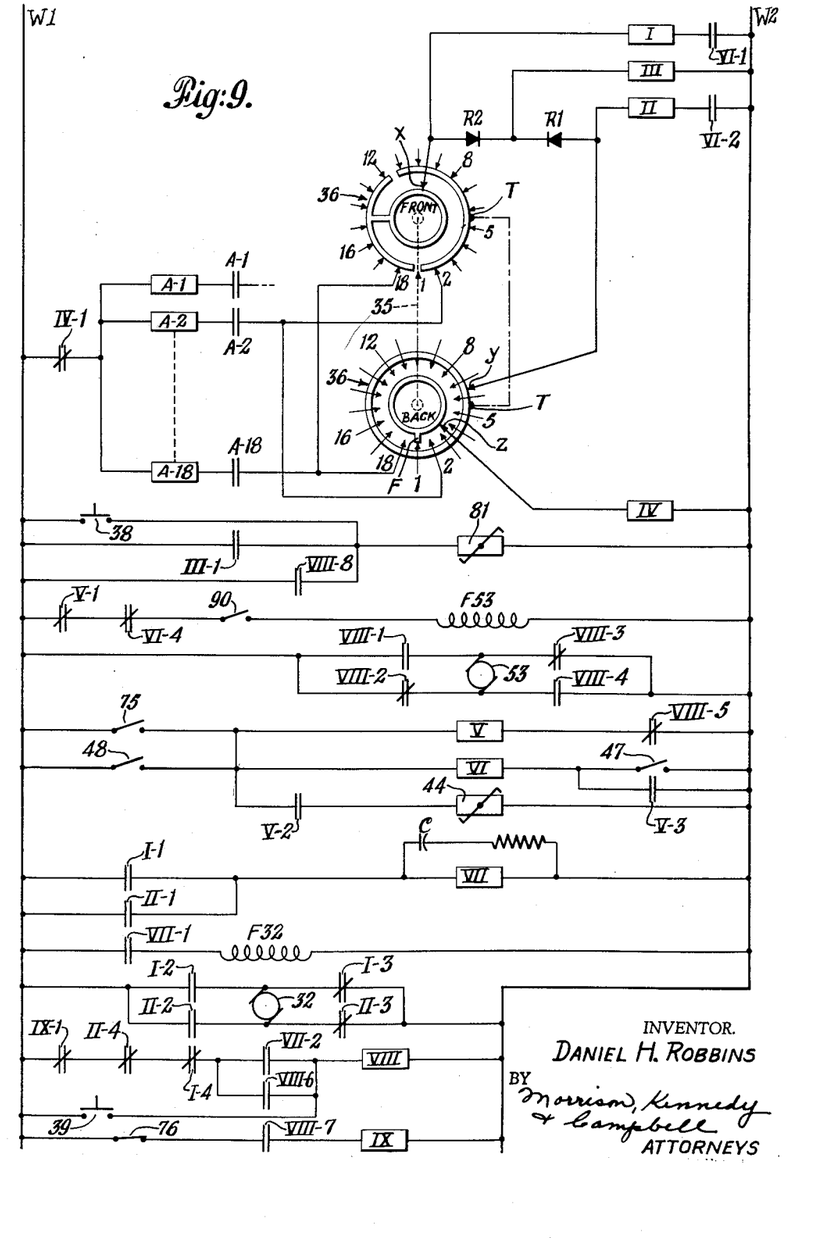
Fig. 9 is a schematic arrangement of the electrical circuits employed with the present invention.

Fig. 9 shows the electrical circuits employed to control the operation of the turret 23, the slinger arm 50, and the clamping mechanism 22. The circuits are shown in a "straight" or "across-the-line" form in which the contacts of a relay are shown separated from the relay coil which operates them and arranged in the circuits which they control. Thus it is possible to arrange each coil circuit in a "straight" line between parallel lines representing the power source.

In the across-the-line diagram, nine relays designated by the Roman numerals I through IX will be formed. Throughout the description which follows, these numerals will be applied to the coils of the relays, and with Arabic reference numerals appended thereto, they will be applied to the contacts of these relays. The relay contacts are shown in deenergized condition. The commutator is, of course, shown schematically, and although all eighteen of its brushes are indicated, the circuits for only two of the brushes are completed, the others being eliminated to simplify the diagram. It is felt that this is permissible since the eliminated circuits would only be repetitious.

Referring now to the diagram, the brushes of the commutator, which correspond to the font plate storage slots in the turret, have been numbered 1 through 18. Assume that the font plate of slot 1 is operatively positioned in the machine, i.e. that slot 1 is in the index position and the commutator is in position 1, and the perforated tape which operates the machine calls for the font plate of slot 2 to replace the font plate of slot 1 in the machine. The advantage, mentioned above, of adapting the commutator to choose direction of rotation now becomes apparent, since by rotating counterclockwise, the turret need travel only one step to its new position, whereas if it were constructed to rotate in only a clockwise direction, the turret would have to travel through seventeen steps to reach the same new position.

The code signal on the tape serves to energize the tape operated relay A2 (it is understood that the coil and contacts shown to represent the relay are symbolic only and that any form of tape operated relay may be employed) which completes a circuit from line W1, through the contacts IV–1, the relay A2, the front commutator brush 2, the tab T which electrically connects one-half the outer ring of the front commutator with the entire outer ring of the back commutator (which connection is indicated by a dot-dash line), the brush y, the rectifier R1, and the coil III, to line W2, thus energizing the coil III. Energization of the coil III serves to engage the contacts III–1 which complete a circuit to energize the solenoid 81, thus releasing the clamping pressure on the font plate of slot 1. As a result of the movement of the link 85, the detent 91 closes the switch 90 to energize the field F53 for the slinger arm motor 53, thereby activating the motor and causing it to drive the slinger arm downwardly in order to deposit the font plate in the storage slot 1.

When the slinger arm reaches its down position, the switch 76 opens and the switch 75 closes, completing a circuit to energize the coil V thereby effecting a separation of the contacts V–1 which deenergizes the field F53 and arrests the slinger arm motor 53. Furthermore, the contacts V–2 are engaged, energizing the solenoid 44 and resulting in the disengagement of the latch 40 with a pin 37, thereby freeing the turret for rotation. The latch 40 closes the switch 48 and then closes the switch 47 to complete a circuit for energizing the coil VI, which becomes self-holding through contact VI–3, causing engagement of the contacts VI–2, thus completing a circuit from line W1, through the contact IV–1, the relay A2, the front commutator brush 2, the tab T, the brush Y, the coil II, and the contacts VI–2, to line W2, thereby energizing the coil II. This results in the engagement of contacts II–1, to energize the coil VII and charge the capacitor C, and the engagement of contacts II–2 and the separation of contacts II–3, to complete a counterclockwise energizing circuit for the turret motor 32. Energization of the coil VII causes engagement of the contacts VII–1 to energize the turret motor field F32, activating the turret motor, and the engagement of contacts VII–2, which has no immediate effect since the contacts II–4 have been separated.

The commutator and the turret rotate counterclockwise until the finger F strikes the back commutator brush 2, whereupon a circuit is completed from line W1 through the contacts IV–1, the relay A2, the brush 2, the brush Z, and the coil IV, thus energizing the coil IV. This effects the separation of the contacts IV–1, whereby the last mentioned circuit as well as the circuits energizing the coils II and III are broken. The contacts II–2 separate, arresting the turret motor 32, and the contacts II–1 separate opening the circuit energizing the coil VII. The coil VII is not, however, immediately deenergized, since for a short period after the circuit opens the capacitor C discharges therethrough. The contacts VII–2 remain engaged long enough, therefore, to complete a circuit energizing the coil VIII, which circuit becomes self-holding through the contacts VIII–6. The contacts VIII–7 engage but there is no immediate effect since the switch 76 remains open until the slinger arm returns to its normal up position. The contacts VIII–8 engage, thus maintaining the solenoid 81 in energized condition, and the contacts VIII–1 and VIII–4 engage while the contacts VIII–2 and VIII–3 separate, thus reversing the polarity of the slinger arm motor 53. In addition, the contacts VIII–5 separate to deenergize the coil V which results in the engagement of contacts V–1 and the deenergization of the solenoid 44, thus allowing the latch 40 to return to its normal position for locking the turret. Note that the switch 48 does not open until the latch 40 completes its travel into normal position, wherein the turret is locked, at which time the coil VI is deenergized to engage the contacts VI-4, whereupon the slinger arm lifts the font plate of slot 2 into operative position in the machine. With the slinger arm in its up position, the switch 76 closes to energize the coil IX, resulting in the separation of the contacts IX-1 to deenergize the coil VIII, the separation of the contacts VIII-8 to deenergize the solenoid 81, whereby the font plate 2 is clamped in place, and the opening of the switch 90 to deenergize the field F53 and arrest the slinger arm motor 53. The control circuits are now in normal relationship once again and ready for another font change signal from the tape.

Now assume that the font plate of slot 18 is called for on the tape to replace the font plate of slot 2. The relay A18 will be energized, completing a circuit from line W1, through the contacts IV-1, the relay A18, the front commutator brush 18, the brush contact X, the rectifier R2 and the coil III, to line W2. The circuit then operates in exactly the same manner as described above until the coil VI is energized, whereupon when the contacts VI-1 and VI-2 engage the coil I is energized rather than the coil II being energized. The contacts I-2 are engaged and the contacts I-3 separate, thus reversing the polarity of the turret motor 32 with respect to its polarity when the coil II was energized, hence the motor will rotate clockwise. Thereafter, the operation is exactly as described above.

Should it be desired to replace an operatively positioned font plate with a font plate which is not among the original eighteen plates stored in the turret 23, the push buttons 38 and 39 are employed. First, the new font plate is placed in a storage slot 27 after one of original plates has been removed therefrom. The push button 38 is then depressed which, it may be seen, serves to unclamp the operatively positioned font plate, activate the slinger arm motor 53, and unlatch the turret, just as hereinbefore described. The turret is then rotated by hand until the slot holding the new font plate reaches the index position at which time the push button 39 is depressed which serves to lock the turret, and reverse the polarity of and activate the slinger arm motor 53. The operation is otherwise essentially as described above.

The invention has been shown and described in preferred form only and by way of example, and many variations and modifications may be made therein and in its mode of application which will still be comprised within its spirit. It is understood, therefore, that the invention is not limited to any specific form or embodiment, except insofar as such limitations are specified in the appended claims.

What is claimed is:

1. A font plate magazine for a photocomposing machine comprising a movably mounted storage member which accommodates a plurality of font plates, means for moving said storage member to bring any selected one of the font plates into an index position, means for arresting the storage member in said index position, and means for transferring the selected font plate from the storage member to its photographic position in the machine and for subsequently restoring it to its place in the storage member, characterized in that said storage member comprises a rotatable turret provided with a plurality of font plate storage slots.

2. A font plate magazine according to claim 1 wherein said storage slots are disposed radially and perpendicularly of the turret.

3. A front magazine according to claim 2 wherein each of said slots is provided with a retaining pin to prevent outward radial movement of the font plate disposed therein during rotation of the turret, and said turret is provided with a conical hub member which together with said retaining pins serves to locate the front plates within said slots.

4. A font plate magazine for a photocomposing machine having a source of light and an optical system associated therewith comprising, a movable storage member adapted to accommodate a plurality of font plates, means for moving said storage member to bring any selected one of the font plates into an index position, pivotal means for transferring the selected font plate from said storage member into operative relation with said optical system, and means for actuating said pivotal means, characterized in that said transfer means comprise two resiliently interconnected arms, and said actuating means are reversible, whereby said arms may be pivoted in one direction to position a font plate in operative relation with said optical system and said arm may be pivoted in a direction opposite to the first direction to replace the same font plate in said storage member.

5. A font plate magazine according to claim 4 wherein said actuating means includes a cam operated gear segment.

6. A font plate magazine according to claim 4 wherein push buttons are provided to operate said actuating means in both directions.

7. A font plate magazine for a photocomposing machine having a source of light and an optical system associated therewith comprising, a movable storage member adapted to accommodate a plurality of font plates, means for moving said storage member to bring any selected one of the font plates into an index position, means for locking said storage member in said index position, and means for transferring the selected font plate from the storage member into operative relation with said optical system, characterized in that said storage member is provided with a plurality of stop elements and said locking means comprises a latch adapted to engage said stop elements, said latch being biased into engagement with said stop elements by a spring and a solenoid being provided to disengage said latch and said stop elements against the force of said spring.

8. In a photocomposing machine having a source of light, an optical system associated therewith, and a plurality of font plates, one of said font plates being adapted to be operatively positioned in relation to said optical system during photocomposition, a font magazine comprising, a movable storage member adapted to accommodate said plurality of font plates, means for moving said storage member as desired so as to align any selected one of said stored font plates with said operative font plate position, means for transferring said aligned font plate from the storage member into operative relation with said optical system and for subsequently restoring said plate to its place in the storage member, characterized in that said storage member comprises a horizontally disposed turret rotatable about a vertical axis, said axis being aligned with said operative font plate position, and said transfer means comprises two resiliently interconnected arms pivoted about a horizontal axis.

9. An arrangement according to claim 8 wherein each of said font plates is provided with a pick-up ear for engagement by one of said pivotal arms.

10. In a photocomposing machine having a source of light, an optical system associated therewith, and a plurality of font plates, one of said font plates being adapted to be operatively positioned in relation to said optical system during photocomposition, a font magazine comprising, a movable storage member adapted to accommodate said plurality of font plates, means for moving said storage member as desired so as to align any selected one of said stored font plates with said operative font plate position, means for transferring said aligned font plate from the stored member into operative relation with said optical system and for subsequently restoring said plate to its place in the storage member, means for clamping said transferred font plate in said operative position, and a plurality of abutments defining said operative font plate position, said clamping means including a clamping frame movable horizontally into and out of clamping relationship with said operatively positioned font plate.

11. An arrangement according to claim 10 wherein said clamping frame is biased into clamping position by spring means, and a solenoid is provided to translate said clamping frame out of clamping position against the force of said spring means.

12. A font plate magazine for a photocomposing machine comprising a storage member in the form of a turret rotatable about a vertical axis and formed with a plurality of vertically disposed font plate storage slots arranged radially about the axis of rotation of the turret, said storage slots being open at the outer periphery of the turret for the insertion and removal of the font plates and also being open at the top of the turret for the transfer of any selected font plate from its storage slot to its photographic position in the machine when the turret is located in an index position as well as for the re-transfer of said font plate from its photographic position back to its storage slot in the turret.

13. A font plate magazine according to claim 12, including means for rotating the turret to bring any selected one of the font plates into the index position.

14. A font plate magazine according to claim 12, including means for effecting such transfer and re-transfer of the selected font plate from and to the turret.

15. A font plate magazine according to claim 13, including means for effecting such transfer and re-transfer of the selected font plate from and to the turret when the latter is in its index position.

16. A font plate magazine according to claim 15, including means for selecting the desired font plate for movement to the index position, and wherein the operation of the means for re-transferring the font plate from its photographic position back to its storage slot in the turret is initiated by the means for selecting a different font plate for movement into the index position.

17. A font plate magazine according to claim 13, wherein the turret rotating means is reversible.

18. A font plate magazine according to claim 13, including means for arresting the turret in said index position.

19. A font plate magazine according to claim 18, wherein said turret arresting means also serve to choose the direction of rotation of the turret.

20. A font plate magazine according to claim 13, including means for locking the rotatable turret in said index position.

References Cited in the file of this patent

FOREIGN PATENTS 1,124,399     France _______________ June 25, 1956

UNITED STATES PATENT OFFICE
CERTIFICATION OF CORRECTION

Patent No. 2,976,787                        March 28, 1961

Daniel H. Robbins

It is hereby certified that error appears in the above numbered patent requiring correction and that the said Letters Patent should read as corrected below.

Column 5, line 5, after "which" insert -- guides the font plate being lifted by the slinger arm 50 --; line 8, strike out "on each side thereof, which ears are pivotally mounted"; column 7, line 69 and 74, for "front", each occurrence, read -- font --.

Signed and sealed this 15th day of August 1961.

(SEAL)
Attest:
ERNEST W. SWIDER

Attesting Officer

DAVID L. LADD

Commissioner of Patents